United States Patent [19]

Brown

[11] Patent Number: 4,507,011

[45] Date of Patent: Mar. 26, 1985

[54] REINFORCED ELASTOMER ATTACHMENT JOINT

[75] Inventor: Stephen T. Brown, Bellevue, Wash.

[73] Assignee: The Boeing Company, Seattle, Wash.

[21] Appl. No.: 374,268

[22] Filed: May 3, 1982

[51] Int. Cl.$^3$ ............................................. F16B 5/00
[52] U.S. Cl. .................................... 403/404; 403/408; 403/388; 403/220; 428/251; 428/129; 244/132; 156/304.3
[58] Field of Search .............. 403/404, 408, 339, 388, 403/224, 220; 428/129, 133, 223, 58, 251, 57, 252; 156/304.3, 304.1, 157; 244/131, 132, 123, 124

[56] References Cited

U.S. PATENT DOCUMENTS

| | | | |
|---|---|---|---|
| 2,760,898 | 8/1956 | Voelker | 428/251 X |
| 3,437,554 | 4/1969 | Gamble | 403/404 X |
| 3,499,622 | 3/1970 | Lugan et al. | 244/132 X |
| 4,004,388 | 1/1977 | Stefanik | 428/251 X |
| 4,048,277 | 9/1977 | Breznak | 156/157 X |
| 4,156,054 | 5/1979 | Gurewitch | 156/304.3 X |
| 4,233,356 | 11/1980 | Jacobs | 428/251 X |
| 4,282,283 | 8/1981 | George et al. | 428/251 X |
| 4,390,585 | 6/1983 | Holden | 428/251 X |

Primary Examiner—Cornelius J. Husar
Assistant Examiner—Joseph A. Fischetti
Attorney, Agent, or Firm—Bernard A. Donahue; Ronald E. Suter; Steven W. Weinrieb

[57] ABSTRACT

A reinforced elastomer attachment joint includes an elastomer section (304) butt bonded to a FIBERGLAS section (332), a boundary line (340) being defined therebetween. One or more fabric plies (338) are embedded within the elastomer (304) and FIBERGLAS (332) sections so as to be capable of transmitting loads from the elastomer section (304) to the FIBERGLAS section (332). The rigid FIBERGLAS section (332) is capable of being drilled and countersunk so as to accomodate fastening means (306) whereby the attachment joint can be secured to basic support structure (302).

17 Claims, 3 Drawing Figures

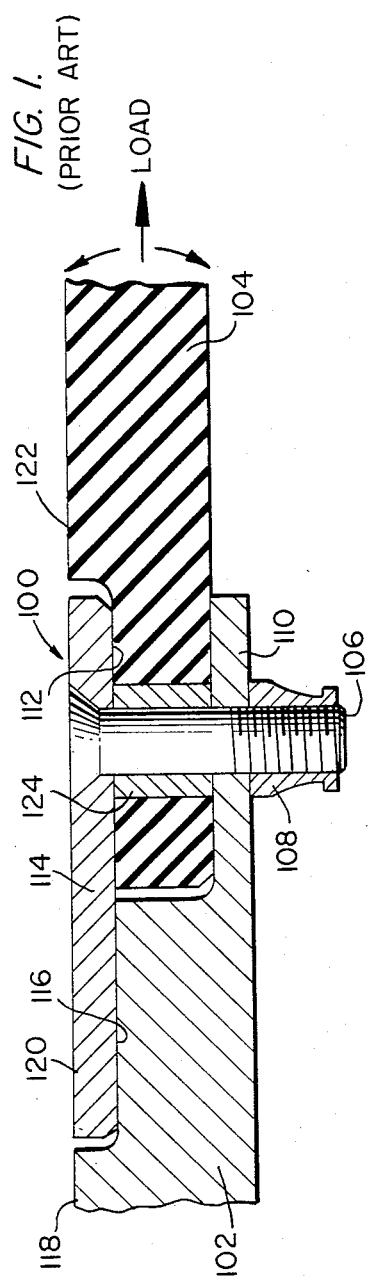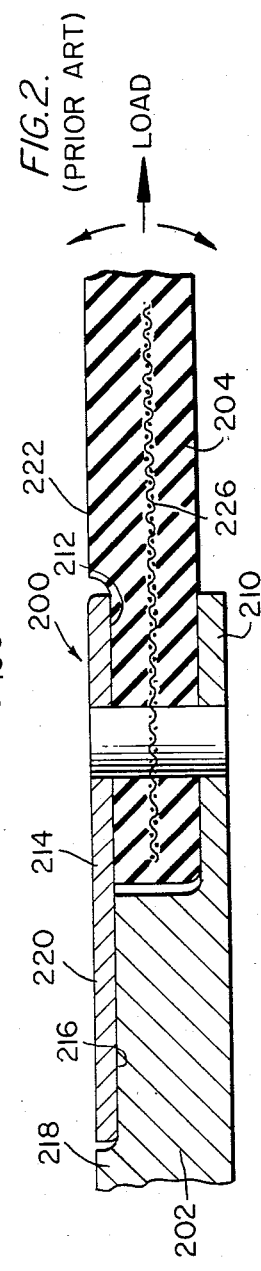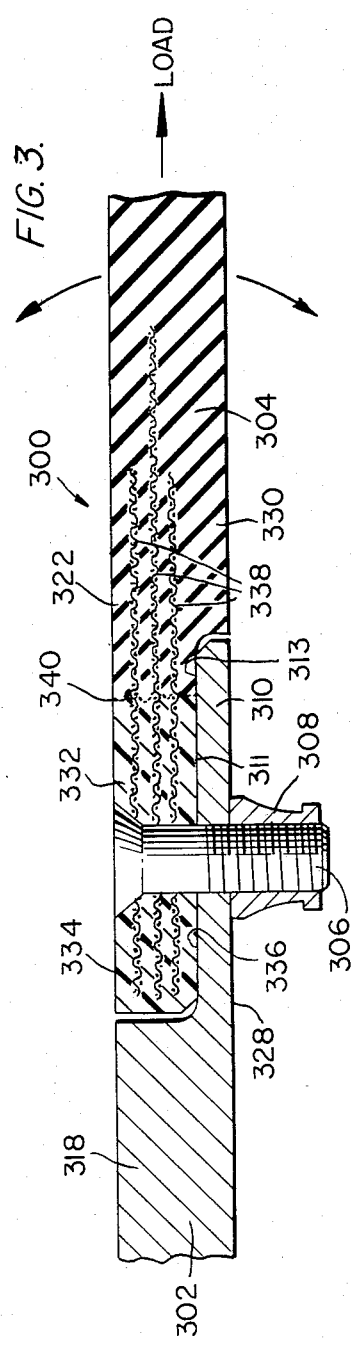

REINFORCED ELASTOMER ATTACHMENT JOINT

TECHNICAL FIELD

The present invention relates generally to attachment joints, and more particularly to a reinforced elastomer attachment joint which will permit the utilization of elastomers within joint systems under relatively large stretch and/or flexing displacement and/or load conditions or requirements without experiencing or exhibiting failure of the joint system, particularly at the locus at which the elastomer is attached or fastened to the basic structural component.

BACKGROUND ART

Elastomers are especially desirable for use within various aircraft and other applications in view of their unique ability to resiliently flex, stretch, compress, and/or seal without substantial deterioration during accommodation of the particular loads impressed thereon. The inherent softness property of the elastomers, however, sometimes manifests itself as a considerable problem which must of course be resolved in order to maintain the integrity and operation of the particular system of which the elastomer is an integral part. The foregoing is especially true, for example, in those applications wherein the elastomer is to be fastened to basic structural components, and wherein further, the elastomer-fastener system is subjected to considerably large stretching and/or flexing displacements or load forces. Specifically, the load forces and/or moments impressed upon the elastomer of the joint system cannot adequately be transferred from the elastomer to the fastener without some type of separation failure being experienced within the vicinity of the fastener locus.

The foregoing can be better appreciated if reference is made to FIGS. 1 and 2 which illustrate two conventional methods or systems of attaching load-transmitting elastomers to aircraft structural components in order to provide an attachment joint. With specific reference being made to FIG. 1, there is shown an attachment joint generally indicated by the reference character 100. The joint includes, for example, an aircraft structural component 102 which may be a part of the aircraft wing leading edge assembly, and the elastomer 104 which is adapted to be interposed between the wing leading edge component 102 and, for example, the main front spar, not shown, of the wing so as to thereby transmit load forces or flexing moments therebetween.

The elastomer 104 may comprise any suitable elastomer fabricated, for example, from silicone rubber, and it is seen that the elastomer 104 is secured to the aircraft structural component 102 by suitable fastening means which may comprise bolts 106 and nuts 108, only one set of the fastening means being shown. In order to enhance the structural integrity of the attachment joint, it is appreciated that the aircraft structural component, as viewed in cross-section, has a stepped configuration such that, for example, the elastomer 104 may be seated and supported upon the lowermost stepped portion 110 of the component 102. In a similar manner, the elastomer, within the vicinity of the joint or connection locus, is also provided with a stepped configuration as views in cross-section and as indicated by the reference character 112. In this manner, a cover plate 114 may be provided so as to seat upon the uppermost stepped portion 116 of component 102 as well as upon the stepped portion 112 of elastomer 104. When this structural system is then fastened together, it is seen that the upper surface 118 of component 102, the upper surface 120 of cover plate 114, and the upper surface 122 of elastomer 104 are all flush or in alignment with respect to each other within a horizontal plane. To complete the entire fastening assembly or attachment joint, clamp-up bushings 124, only one of which is shown, are bonded within the rubber elastomer 104 at the fastener loci so as to annularly surround the fastener bolts 106 and be interposed between the lowermost stepped portion 110 of the structural component 102 and the cover plate 114. In this manner, when the bolt fastening means are tightened, that portion of the elastomer 104 interposed between the cover plate 114 and the stepped portion 110 of component 102 is not excessively stressed by the resulting compression forces.

While the attachment joint system illustrated in FIG. 1 would thus appear to exhibit the requisite structural integrity required under the various operating load conditions to which such a system would normally be subjected, in fact the attachment joint illustrated will exhibit failure within the vicinity of the fastener as opposed to, for example, failure of the elastomer itself when substantially large stretching and/or flexing displacements, loads, and moments are impressed thereon. This is due to the fact that the elastomer 104 will experience separation from the bushings 124 due to inherent incompatibility therebetween, especially under such severe load, displacement, or moment conditions.

Considering now the attachment joint system illustrated within FIG. 2, it is initially noted that this system is similar to that illustrated within FIG. 1, and therefore, the reference characters applied to the various components of the system are similar although are also noted to be within the 200 range whereas those of FIG. 1 were within the 100 range. The system of FIG. 2 was constructed so as to serve as an improved alternative to the system illustrated within FIG. 1 and has been generally designated by the reference character 200. In this attachment system, it is noted that the bushings 124 have been eliminated, and the elastomer 204 has been reinforced with one or more plies or layers of a suitable fabric or FIBERGLAS (Registered Trademark) 226, although only one ply of the fabric is illustrated. The fabric or FIBERGLAS 226 is embedded within the elastomer 204 and extends throughout the same within the vicinity of the fastener loci in order to allegedly improve the structural integrity of the illustrated attachment joint. Nevertheless, as with the attachment joint of the embodiment illustrated within FIG. 1, the attachment joint embodied within FIG. 2 has also experienced failure at the fastener attachment loci in lieu of failure of the elastomer per se.

In particular, in the instance wherein one or more plies of fabric reinforcement are employed within the elastomer 204, the reinforced elastomer still exhibits failure under the impressed load, displacement, and moment conditions due to insufficient reinforcement at the fastener sites. In other words, even when reinforced with multiple fabric plies, the composite reinforced elastomer is still inherently incompatible with the fastening means and does not have the requisite structural strength or rigidity within the vicinity of the fastener sites to in fact distribute the impressed load forces, displacements, and moments to the fastening means without separating from the fasteners and thus exhibiting failure.

In a similar manner, when the elastomer is reinforced with one or more plies or layers of FIBERGLAS, the latter separate from the elastomer in shear due, for example, to the different tensile stretch properties characteristic of the elastomer and FIBERGLAS components. In addition, the rubber elastomer has been observed to have subsequently separated or torn away from the fastening means thereby again resulting in failure of the joint.

A need therefore exists for an improved reinforced elastomer attachment joint which will in fact be able to withstand and transmit substantially large stretching and flexing displacements, loads, and moments with respect to basic support structure without exhibiting failure or a deterioration in structural integrity under such operating conditions.

Accordingly, it is an object of the present invention to provide a new and improved reinforced elastomer attachment joint.

Another object of the present invention is to provide a new and improved reinforced elastomer attachment joint which will overcome the operational disadvantages characteristic of prior art elastomer attachment joints.

Still another object of the present invention is to provide a new and improved reinforced elastomer attachment joint which is capable of withstanding substantially large stretching and flexing displacements, load forces, and moments impressed thereon during operational modes without experiencing or exhibiting failure.

Yet another object of the present invention is to provide a new and improved reinforced elastomer attachment joint which is capable of withstanding substantially large stretching and flexing displacements, load forces, and moments impressed thereon during operational modes without experiencing or exhibiting deterioration of structural integrity.

Still yet another object of the present invention is to provide a new and improved reinforced elastomer attachment joint which is capable of transmitting substantially large stretching and flexing displacements, load forces, and moments to basic support structure without experiencing or exhibiting failure.

Yet still another object of the present invention is to provide a new and improved reinforced elastomer attachment joint which is capable of transmitting substantially large stretching and flexing displacements, load forces, and moments to basic support structure without experiencing or exhibiting deterioration of structural integrity.

A further object of the present invention is to provide a new and improved reinforced elastomer attachment joint wherein areas of non-compatibility between the various components of the joint or system have been eliminated so as to in fact achieve the maintenance of the structural integrity of the system and thereby prevent structural failure or deterioration of the system.

A yet further object of the present invention is to provide a new and improved reinforced elastomer attachment joint wherein the system or joint exhibits sufficient reinforcement, structural integrity, and rigidity, particularly within the vicinity of the basic support structure and the fastening means thereof such that the system or joint will not experience or exhibit failure or deterioration under operational conditions.

A still further object of the present invention is to provide a new and improved reinforced elastomer attachment joint which is relatively simple in structure and economical to manufacture.

A still yet further object of the present invention is to provide a new and improved reinforced elastomer attachment joint which facilitates the elimination of several of the hardward components characteristics of prior art or conventional elastomer attachment joints or systems.

DISCLOSURE OF THE INVENTION

The foregoing and other objects of the present invention are achieved through the provision of a reinforced elastomer attachment joint which includes the use of layers or plies of FIGERGLAS prepreg strips with one or a multiple number of plies or layers of a suitable fabric interposed between the layers or plies of the FIGERGLAS prepreg strips. In a similar manner, one or a multiple number of plies or layers of a suitable silicone rubber elastomer have the same fabric plies interposed therebetween. The FIBERGLAS prepreg strips, the elastomer strips, and the interlayered fabric plies are so-cured within a suitable press, and the resulting improved reinforced elastomer attachment joint is obtained.

The layers, strips, or plies of the FIBERGLAS are in butt contact with the layers, strips, or plies of the silicone rubber elastomer, and there is only limited intermixing of these two components along the boundary line defined therebetween. In this manner, as there is no substantial intermixing or interlayering of these two components, the incompatability of such components, as is characteristic of the prior art joint systems, has been effectively eliminated. In a similar manner, the cured FIBERGLAS component of the joint system exhibits substantial rigidity to the effect that the same may be drilled and countersunk so as to be adapted for attachment to the basic support structure by suitable fastening means. In view of the fact therefore that the elastomer is not in operational contact with the fastening means, this area of incompatibility, as exhibited by the prior art attachment joint systems, has also been able to be eliminated. Loads, displacements, and moments are now therefore transmitted by the elastomer through the fabric plies or layers directly to the FIBERGLAS portion of the joint which, in turn, transmits these loads, displacements, and moments to the fastening means and the supporting structure. The load forces and the like are thus transmitted or carried for the most part by means of the fabric plies or layers and the number of fabric plies or layers to be utilized within a particular application is determined by means of the magnitude of the load forces, moments, and the like to be impressed upon the joint system.

The system of the present invention is thus seen to exhibit unique properties in view of the fact that after the curing of the joint, the fabric exhibits properties of both the FIBERGLAS and the elastomer in those regions where the fabric is interlayered with the FIBERGLAS and the elastomer, respectively. This permits the elastomer portion of the joint to flex and stretch as desired, and yet the joint is provided with a rigid attachment area for accommodating the fastening means for securing the joint system to the basic structural component of the aircraft. As will be noted in more detail hereinafter, this permits the FIBERGLAS portion of the joint to be countersunk for in fact accommodating the fastening means, whereas within prior art or conventional systems, the elastomer had to be overlayed with a cover plate, the latter being countersunk for accommodating the fastening means. In this manner, the cover plate hardware is able to be eliminated from the joint system.

It is also noted that with the joint of the present invention, the stretching or tensile loads, for example, of the entire system are now directly related to the elastic limit of the particular elastomer being employed. This is in view of the fact that with the correct number of fabric plies being employed for particular load conditions, the tensile strength properties of the joint will now be determined by means of the tensile strength of the particular elastomer employed. In other words, the fabric tensile strength is now greater than that of the elastomer whereby should any failure in the system occur, it would most likely occur within the elastomer and not within the attachment or fastener region per se as was characteristic of the prior art systems. In conjunction with the properties of the fabric plies employed within the system of the present invention, it is lastly noted that the limited intermixing of the FIBERGLAS and elastomer along the boundary line defined between the two components also serves to soften the portions of the FIBERGLAS within the immediate vicinity of the boundary line and intermixed portions of the elastomer and FIBERGLAS, whereby the fabric portions are not abraded by the normally hard FIBERGLAS, the fabric portions are thus protected, and their service life accordingly extended.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a cross-sectional view of one prior art or conventional elastomer attachment joint system and showing the cooperative parts thereof;

FIG. 2 is a view similar to that of FIG. 1 showing however another prior art or conventional elastomer attachment joint system and its cooperative parts; and FIG. 3 is a view similar to that of FIG. 1 showing however the new and improved reinforced elastomer attachment joint system of the present invention and its cooperative parts.

BEST MODE FOR CARRYING OUT THE INVENTION

Referring again to the drawings, and more particularly to FIG. 3 thereof, there is shown the new and improved reinforced elastomer attachment joint of the present invention as generally designated by the reference character 300. The joint system comprises a suitable elastomer 304 which may be any silicone elastomer, the same being adapted to be secured to a basic structural aircraft component 302. The elastomer 304 and aircraft component 302 are seen to have reversely stepped cross-sectional configurations such that the upper surface 311 of the lower stepped portion 310 of component 302 is in engaged contact with the lower surface 313 of the upper stepped portion of elastomer 304. In this manner, the uppermost surfaces 318 and 322 of the aircraft component 302 and the elastomer 304, respectively, are in flush alignment with one another within a horizontal plane, and similarly for the lowermost surfaces 328 and 330 of the structural component 302 and the elastomer, respectively.

In accordance with the unique joint structure of the present invention, the elastomer 304 is adapted to be mated with a FIBERGLAS section 332 of the joint in a butt contact mode. It is seen that when the joint system is completely assembled, the upper surface 334 of the FIBERGLAS section 332 will be disposed within the horizontal alignment plane defined by the uppermost surfaces 318 and 322 of the structural component 302 and the elastomer, respectively, while the lower surface 336 of the FIBERGLAS section 332 is similarly in a horizontal planar alignment with lower surface 313 of elastomer 304. In this manner, the FIBERGLAS section 332 is entirely supported upon the stepped portion 310 of the structural component 302.

Continuing further with the unique joint structure of the present invention, one or more plies of a suitable fabric, such as, for example, that marketed under the name NOMEX and manufactured by E. I. Du Pont De Nemours & Co., are incorporated within the joint structure by being interposed between plies or layers of the FIBERGLAS and the elastomer. The FIBERGLAS section per se of the joint may be fabricated from any suitable high-temperature FIBERGLAS prepreg which means that the FIBERGLAS is initially obtained in uncured strips having an epoxy resin already impregnated therein. The strips of FIBERGLAS are inserted within a suitable mold press, not shown, and the fabric plies 338 are interlayered therewith until the desired thickness of the joint is obtained. At the same time, strips or plies of the silicone rubber elastomer are also placed within the mold press and interlayered with the fabric plies 338. Co-curing of the three system components, that is, the elastomer, the FIBERGLAS, and the fabric, results in the unique elastomer attachment joint of the present invention. The epoxy resin within the FIBERGLAS prepreg of course serves to bond the FIBERGLAS and the fabric plies 338 together, while the fabric has been bonded to the elastomer as a result of suitable priming of the fabric prior to the mold press curing.

The curing of the composite attachment joint imparts unique properties to the joint components. In particular, it is noted that the elastomer section of the joint is permitted to flex and stretch, while the FIBERGLAS portion of the joint is substantially rigid and provides the requisite structural strength for securing the joint to the aircraft structural component 302. The fabric plies 338 have the unique property or characteristic of imitating the particular composite section within which they are housed or accommodated. Those sections of the fabric plies 338 that are housed within the FIBERGLAS section 332 of the joint exhibit substantial rigidity similar to that of the FIBERGLAS section 332, while those sections of the fabric plies 338 that are housed within the elastomer section 304 of the joint exhibit flexibility similar to that of the elastomer section 304. At the butt-joined boundary line 340 defined between the elastomer and FIBERGLAS sections 304 and 332, respectively, of the joint 300, there is some limited intermixing of the FIBERGLAS and elastomer materials, and such intermixing serves to soften the FIBERGLAS locally within the vicinity of the boundary line 340 defined between the FIBERGLAS and elastomer sections of the joint. As a result, the fabric plies are not abraded by the normally hard FIBERGLAS, and the service lives of the plies are thus enhanced.

In view of the substantial rigidity of the FIBERGLAS section 332 of the joint of the present invention, in order to render the joint capable of being attached or secured to basic support structure 302, the FIBERGLAS section 332 of the joint may be directly drilled and countersunk so as to accommodate suitable bolt and nut fasteners 306 and 308. As a result of this structure, and the capability of directly accommodating the fastening means 306–308, the joint of the present invention has facilitated the elimination of the cover plate hardware such as those shown in the conventional joint systems of FIGS. 1 and 2 at 114 and 214 respectively.

When loads, displacements, and/or moments are thus applied to the elastomer section 304 of the joint of the present invention, it will now be appreciated that such load forces, moments, and the like can be distributed to the fastening means 306–308 and the basic aircraft support structure without the joint of the present invention exhibiting or experiencing failure as was characteristic of prior art or conventional joint systems. In particular, the loads or moments are transferred from the elastomer section 304 to the FIBERGLAS section 332 through means of the fabric plies 338, and it is to be further appreciated that the number of plies of the fabric 338 can be selected in accordance with the anticipated load or moment factors to be experienced under operational conditions. In view of the fact that there is no substantial contact between the elastomer and the FIBERGLAS sections of the joint system as was characteristic of the joint system of FIG. 2, the joint of the present invention does not experience the shear separation problems which characterized the system of FIG. 2. In addition, in view of the additional fact that the fastening means 306–308 are disposed within the rigid FIBERGLAS section 332 of the joint of the present invention, incompatible separation problems within this area of the joint have also been able to be eliminated. As a result, and depending upon the number of fabric plies selectively disposed within the joint of the present invention, the shear or tensile strength of the joint is now dependent upon the elastic limit of the elastomer for the shear or tensile strength of the fabric plies can be made greater than that of the elastomer. Consequently, if failure should occur, it would probably occur within the elastomer per se and not within the vicinity of the joint fastening means as was characteristic of the prior art conventional systems.

Obviously, many modifications and variations of the present invention are possible in light of the above teachings. It is therefore to be understood that within the scope of the appended claims, the present invention may be practiced otherwise than as specifically described herein.

I claim:

1. A reinforced attachment joint, comprising:
    a first section fabricated from a first material;
    a second section, fabricated from a second material which is different from said first material comprising said first attachment joint section, substantially butt bonded to said first section so as to substantially define a boundary line between said first and second attachment joint sections; and
    means embedded within said first and second attachment joint sections and extending for a substantial distance, in opposite directions across and beyond said boundary line, into each of said first and second attachment joint sections for connecting said first and second attachment joint sections together and for transmitting load forces from said first attachment joint section to said second attachment joint section.

2. The reinforced attachment joint as set forth in claim 1, wherein:
    said second material is structurally incompatible with said first material under load conditions.

3. The reinforced attachment joint as set forth in claim 1, wherein:
    said first section material is a silicone rubber elastomer.

4. The reinforced attachment joint as set forth in claim 1, wherein:
    said second section material is FIBERGLAS.

5. The reinforced attachment joint as set forth in claim 1, wherein:
    said load transmission means comprises at least one ply of fabric.

6. The reinforced attachment joint as set forth in claim 1, further comprising:
    a rigid structural support member; and
    aperture means defined within said second section of said attachment joint for accommodating fastening means for securing said attachment joint to said rigid structural support member.

7. The reinforced attachment joint as set forth in claim 6, wherein:
    said rigid structural support member and said first section of said attachment joint have stepped profile configurations for engaging each other such that the upper and lower surfaces of said structural support member and said first attachment joint section are in flush alignment with each other within horizontal planes.

8. The reinforced attachment joint as set forth in claim 1, wherein:
    said first and second sections are intermixed in a limited manner along said boundary line defined therebetween such that material of said second section is softened locally within the vicinity of said boundary line such that said load transmission means of said first and second attachment joint sections are free from abrasion by said material of said second section at the locus of said boundary line.

9. The reinforced attachment joint as set forth in claim 1, wherein:
    said second section material is a FIBERGLAS prepreg.

10. A reinforced attachment joint, comprising:
    a first section fabricated from an elastomer material;
    a second section, fabricated from FIBERGLAS, substantially butt bonded to said first section so as to substantially define a boundary line between said first and second attachment joint sections; and
    a plurality of fabric plies embedded within said first and second attachment joint sections and extending for a substantial distance, in opposite directions across and beyond said boundary line, into each of said first and second attachment joint sections for connecting said first and second attachment joint sections together, and for transmitting load forces from said first attachment joint section to said second attachment joint section.

11. A reinforced attachment joint, comprising:
    a first section fabricated from an elastomer material;

a second section, fabricated from FIBERGLAS, substantially butt bonded to said first section so as to substantially define a boundary line between said first and second attachment joint sections;

a plurality of fabric plies embedded within said first and second attachment joint sections and extending for a substantial distance, in opposite directions across and beyond said boundary line, into each of said first and second attachment joint sections for connecting said first and second attachment joint sections together, and for transmitting load forces from said first attachment joint section to said second attachment joint section;

a rigid structural support member; and fastening means operatively connecting said second attachment joint section to said rigid structural support member for transmitting said load forces from said second attachment joint section to said rigid structural support member.

12. An attachment joint as set forth in claim 11, wherein:
said fastening means comprises a bolt fastener.

13. An attachment joint as set forth in claim 10, wherein:
said elastomer is silicone rubber.

14. An attachment joint as set forth in claim 11, wherein:
said elastomer is silicone rubber.

15. An attachment joint as set forth in claim 6, wherein:
said fastening means comprises a bolt fastener.

16. An attachment joint as set forth in claim 12, wherein:
said plurality of fabric plies annularly surround said bolt fastener.

17. An attachment joint as set forth in claim 15, wherein:
said plurality of fabric plies annularly surround said bolt fastener.

* * * * *

UNITED STATES PATENT AND TRADEMARK OFFICE
CERTIFICATE OF CORRECTION

PATENT NO. : 4,507,011
DATED : March 26, 1985
INVENTOR(S) : Stephen T. Brown

It is certified that error appears in the above-identified patent and that said Letters Patent are hereby corrected as shown below:

Column 1, line 18, before "Elastomers," the following sentence should appear: --The Government has rights in this invention pursuant to Contract No. F33615-78-C-3027 awarded by the U.S. Air Force.--

Signed and Sealed this

Twenty-fourth Day of September 1985

[SEAL]

Attest:

Attesting Officer

DONALD J. QUIGG

Commissioner of Patents and Trademarks—Designate